(12) United States Patent
Chalk (10) Patent No.: US 11,164,393 B2
(45) Date of Patent: Nov. 2, 2021

(54) GENERATING DISPLAY OF A 3-DIMENSIONAL OBJECT

(71) Applicant: Microsoft Technology Licensing, LLC, Redmond, WA (US)

(72) Inventor: Daniel James Chalk, Ibstock (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 49 days.

(21) Appl. No.: 16/132,152

(22) Filed: Sep. 14, 2018

(65) Prior Publication Data

US 2020/0090416 A1    Mar. 19, 2020

(51) Int. Cl.
*G06T 19/20* (2011.01)
*G06T 15/80* (2011.01)
*G06T 17/20* (2006.01)

(52) U.S. Cl.
CPC ............. *G06T 19/20* (2013.01); *G06T 15/80* (2013.01); *G06T 17/20* (2013.01)

(58) Field of Classification Search
None
See application file for complete search history.

(56) References Cited

U.S. PATENT DOCUMENTS

| | | | |
|---|---|---|---|
| 2007/0279414 A1 | 12/2007 | Vandenbrande et al. | |
| 2008/0292151 A1* | 11/2008 | Kurtz | A61B 5/445 382/128 |
| 2008/0294012 A1* | 11/2008 | Kurtz | A61B 5/445 600/300 |
| 2009/0002376 A1* | 1/2009 | Xu | G06T 13/40 345/473 |
| 2014/0114630 A1* | 4/2014 | Brave | G06F 30/20 703/6 |
| 2015/0123967 A1* | 5/2015 | Quinn | G06T 7/75 345/420 |
| 2018/0240272 A1* | 8/2018 | Doolittle | G06T 3/40 |
| 2018/0253895 A1* | 9/2018 | Arumugam | G06K 9/00208 |

OTHER PUBLICATIONS

Sharf, Andrei, et al. "Snappaste: an interactive technique for easy mesh composition." The Visual Computer 22.9-11 (2006): 835-844.*
Author unknown, "How to animate a character with blend shapes," published Oct. 11, 2013, retrieved from https://www.creativebloq.com/maya/how-animate-character-blend-shapes-10134835 Dec. 31, 2020.*

(Continued)

*Primary Examiner* — Zhengxi Liu (57) ABSTRACT

A first part of a 3-dimensional object is generated for display and displayed on a display device. The first part has at least a base interface and a first interface. The displayed first part is caused to change shape. A second part of the 3-dimensional object is generated for display, the second part having at least a base interface. The second part is translated and oriented so that the base interface of the second part mates with the first interface of the first part when the second part is displayed on the display device. The second part is displayed on the display device with the base interface of the second part mating with the first interface of the first part.

9 Claims, 6 Drawing Sheets

(56) References Cited

OTHER PUBLICATIONS

Athanasiadis, Theodoras, et al. "Feature-based 3D morphing based on geometrically constrained spherical parameterization." *Computer Aided Geometric Design* 29.1 (2012): 2-17.*

Haubenwallner, "Procedural Generation using Grammar based Modelling and Genetic Algorithms," *Proc. CESCG 2016*, 8 pp. (Jan. 2016).

International Search Report and Written Opinion dated Nov. 21, 2019, from International Patent Application No. PCT/US2019/038844, 25 pp.

Prusinkiewicz et al., "L-Systems: From the Theory to Visual Models of Plants," *Proc. 2nd CSIRO Symp. On Computational Challenges in Life Sciences*, 32 pp. (Jan. 1996).

Prusinkiewicz et al., *The Algorithmic Beauty of Plants*, Chapter 1, "Graphical modeling using L-systems," pp. 1-50 (1990).

SpeedTree, "FAQ—Modeling," downloaded from https://store.speedtree.com/faq/, 12 pp. (downloaded on Oct. 24, 2018).

Wikipedia, "L-system" downloaded from https://en.wikipedia.org/w/index.php?title=L-system&oldid=858655322, 13 pp., (Sep. 8, 2018).

Wikipedia, "SpeedTree," downloaded from https://en.wikipedia.org/wiki/SpeedTree; 12 pp. (Jun. 18, 2018).

\* cited by examiner

GENERATING DISPLAY OF A 3-DIMENSIONAL OBJECT

TECHNICAL FIELD

The present disclosure relates to a method, apparatus and computer program for generating a display of a 3-dimensional object.

BACKGROUND

There are many applications where 3-dimensional objects are computer-generated for display on a display device. This includes for example computer games, computer drawings and animation packages and the like. Currently, the generated 3-dimensional objects are usually static in the sense that they do not and cannot change or evolve over time. If a 3-dimensional object is intended to change or evolve over time, currently it is common to model, in advance, each iteration of the 3-dimensional object at different times. This in effect produces a set of static images of the 3-dimensional object at the different times, which are then displayed in turn. This is however time-consuming as an artist or other content creator has to prepare each image individually. As an alternative, a computer can be used to procedurally model the static images of the 3-dimensional object at the different times, but this tends to result in objects that are identical or at least unnatural in appearance. Either way, it also means that a potentially large amount of data needs to be stored and sent to for example a graphics processor for display, which then need to process the large amounts of data, which may not always be practical or even feasible.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted herein.

According to a first aspect disclosed herein, there is provided a computer-implemented method of generating a display of a 3-dimensional object, the method comprising:

generating for display a first part of a 3-dimensional object, the first part having at least a base interface and a first interface;

displaying the first part on a display device;

causing the displayed first part to change shape;

generating for display a second part of the 3-dimensional object, the second part having at least a base interface;

translating and orientating the second part so that the base interface of the second part mates with the first interface of the first part when the second part is displayed on the display device; and displaying the second part on the display device with the base interface of the second part mating with the first interface of the first part.

This enables the first and second parts to be joined to each other seamlessly, giving a smooth appearance to the final object which is formed of the parts.

The base interface of the second part typically has the same shape as the first interface of the first part. Moreover, in some examples the generating for display the second part of the 3-dimensional object comprises setting the size of the second part such that the base interface of the second part is the same size as the first interface of the first part at the time that the second part is displayed. This further assists in ensuring that there is a seamless join between the base interface of the second part and the first interface of the first part. The respective sizes of the base interface of the second part and the first interface of the first part need not be exactly the same, and may for example be the same within a tolerance such that any slight difference is not perceptible to a viewer of the display device. Factors relevant for this will include for example the screen resolution of the display device (i.e. of the image that is sent to the display device).

In an example, the causing the displayed first part to change shape causes the displayed first part to change shape over time such that the displayed 3-dimensional object changes shape over time.

In an example, the method comprises:

causing the displayed first part to further change shape; and causing the displayed second part to change shape;

wherein the changing shapes of the first and second parts are such that the base interface of the second part continues to mate with the first interface of the first part.

In an example, the method comprises:

generating for display a third part of the 3-dimensional object, the third part having at least a base interface;

displaying the third part on the display device, the displayed third part being translated and oriented as necessary so that the base interface of the third part mates with a second interface of the first part or a first interface of the second part.

Further parts may similarly be generated and displayed, with the further parts being mated with previously displayed parts, optionally in a hierarchical fashion.

In an example, each part of the object is instanced by a graphics processor based on the same data structure.

This provides for efficient use of the graphics processor as it reduces the amount of data that has to processed by the graphics processor. It also reduces the amount of data that has to be sent to the graphics processor.

In an example, the data structure contains data that defines the shape of a reference part, the data structure containing difference data which defines differences in the shape of the parts of the object at a number of different points in time relative to the shape of the reference part.

This further provides for efficient use of the graphics processor as it further reduces the amount of data that has to processed by the graphics processor. It also further reduces the amount of data that has to be sent to the graphics processor. The different parts of the 3-dimensional object can be generated for display based on the differences in shape from the reference part that correspond to the time that the part is being displayed on the display device.

The reference part may be for example a globally mature part, which is the part when it is at a maximum size. In the case of an object that is intended to grow over time when displayed, this corresponds to when the part is at its oldest state. On the other hand, in the case of an object that is intended to shrink or reduce in size over time when displayed, this corresponds to when the part is at its youngest state. Nevertheless, in general it is possible to for example blend from oldest to youngest or youngest to oldest irrespective of the reference part.

In an example, the shape of the reference part is defined by a plurality of vertices, and the difference data comprises translational data for each vertex, wherein the translational data for each vertex represents the difference in position for the vertex in each part of the object at the different points in time relative to the position of the vertex in the reference part.

The translational data may be sent to the graphics processor as a texture along with the data that defines the shape of the reference part.

According to a second aspect disclosed herein, there is provided a computer-implemented method of generating time-changing assets on a computer display, the method comprising:
(a) accessing a set of rules stored in electronic storage, wherein the rules define at least a base asset, and evaluating the rules to generate a set of hierarchical commands;
(b) evaluating the hierarchical commands to construct an asset for display, wherein the hierarchical commands include at least an asset command defining an asset type and a utility command, the utility command being at least one of a rotation command and an age constraint, wherein the asset type is associated with transformation data, the result of the evaluating being a number of slices through time of the asset arranged hierarchically in time; and
(c) visualizing the asset for display by generating successive slices of the asset in time for display and presenting the asset on a computer display, each slice having transformation data for deforming the slice depending on its age and subject to any age constraint applied by an age constraint utility command.

In an example, the base asset is in the form of a manually designed mesh.

In an example, at least one of (a), (b) and (c) is computed at runtime to render the asset in a time changing manner on the computer display.

In an example, the rules are represented as a linear structure of data symbols defining an asset.

In an example, the rules are evaluated according to a parallel rewriting system.

In an example, the transformational data comprises a 4D positional offset, a quaternion for aligning the next asset, for each branching point on the asset, wherein the 4th component of the 4D positional offset offsets each asset's age relative to an adjacent asset.

In an example, the utility command is an instruction of one or more of the following: gravitational force, custom force, random rotation, clockwise yaw rotation, counter-clockwise yaw rotation, end branch and prevent branch aging.

In an example, the method comprises setting an age on materials which manage the transformational data via a uniform parameter, whereby a shader can sample the relative deformation data from the texture and reposition vertices of a mesh accordingly.

According to a third aspect disclosed herein, there is provided a computer system comprising:
at least one processor;
and at least one memory including computer program instructions;
the at least one memory and the computer program instructions being configured to, with the at least one processor, cause the computer system to carry out a method of generating a display of a 3-dimensional object, the method comprising:
generating for display a first part of a 3-dimensional object, the first part having at least a base interface and a first interface;
displaying the first part on a display device;
causing the displayed first part to change shape;
generating for display a second part of the 3-dimensional object, the second part having at least a base interface;
translating and orientating the second part so that the base interface of the second part mates with the first interface of the first part when the second part is displayed on the display device; and
displaying the second part on the display device with the base interface of the second part mating with the first interface of the first part.

According to a fourth aspect disclosed herein, there is provided a computer system comprising:
at least one processor;
and at least one memory including computer program instructions;
the at least one memory and the computer program instructions being configured to, with the at least one processor, cause the computer system to carry out a method of generating time-changing assets on a computer display, the method comprising:
(a) accessing a set of rules stored in electronic storage, wherein the rules define at least a base asset, and evaluating the rules to generate a set of hierarchical commands;
(b) evaluating the hierarchical commands to construct an asset for display, wherein the hierarchical commands include at least an asset command defining an asset type and a utility command, the utility command being at least one of a rotation command and an age constraint, wherein the asset type is associated with transformation data, the result of the evaluating being a number of slices through time of the asset arranged hierarchically in time; and
(c) visualizing the asset for display by generating successive slices of the asset in time for display and presenting the asset on a computer display, each slice having transformation data for deforming the slice depending on its age and subject to any age constraint applied by an age constraint utility command.

According to a fifth aspect disclosed herein, there is provided a computer program comprising a set of computer-readable instructions, which, when executed by a computer system, cause the computer system to carry out a method of generating a display of a 3-dimensional object, the method comprising:
generating for display a first part of a 3-dimensional object, the first part having at least a base interface and a first interface;
displaying the first part on a display device;
causing the displayed first part to change shape;
generating for display a second part of the 3-dimensional object, the second part having at least a base interface;
translating and orientating the second part so that the base interface of the second part mates with the first interface of the first part when the second part is displayed on the display device; and
displaying the second part on the display device with the base interface of the second part mating with the first interface of the first part.

There may be provided a non-transitory computer-readable storage medium storing a computer program as described above.

According to a sixth aspect disclosed herein, there is provided a computer program comprising a set of computer-readable instructions, which, when executed by a computer system, cause the computer system to carry out a method of generating time-changing assets on a computer display, the method comprising:

(a) accessing a set of rules stored in electronic storage, wherein the rules define at least a base asset, and evaluating the rules to generate a set of hierarchical commands;

(b) evaluating the hierarchical commands to construct an asset for display, wherein the hierarchical commands include at least an asset command defining an asset type and a utility command, the utility command being at least one of a rotation command and an age constraint, wherein the asset type is associated with transformation data, the result of the evaluating being a number of slices through time of the asset arranged hierarchically in time; and (c) visualizing the asset for display by generating successive slices of the asset in time for display and presenting the asset on a computer display, each slice having transformation data for deforming the slice depending on its age and subject to any age constraint applied by an age constraint utility command.

There may be provided a non-transitory computer-readable storage medium storing a computer program as described above.

BRIEF DESCRIPTION OF THE DRAWINGS

To assist understanding of the present disclosure and to show how embodiments may be put into effect, reference is made by way of example to the accompanying drawings in which.

DETAILED DESCRIPTION

In this disclosure the term "procedurally create" or the like can be taken to mean to automatically create without any user interaction. The term "styled" can be taken to mean using a set of rules to define a certain style. In the case of trees for example, different styles may correspond to different species of tree, such as a willow tree or an oak tree. As another example in the case of a cave or tunnel system, different styles may correspond to different basic types of caves or tunnel, such as for example a gold mine, a glacier cave, a solutional cave, etc. The term "hierarchical" or "tree-like structure" or the like can be taken to denote repeating or fractal type geometries, including but not limited to trees, a cave network, or a bolt of lightning. Hand authored mesh assets or parts is a reference to custom geometry created by artists or other content creators that would otherwise not be created procedurally. This might be for example parts of a treehouse or more complex tree parts.

This disclosure describes an example of a method for generating objects for display on a display device, including in particular 4D hierarchical or tree-like structures though other structures can be created, from any arbitrary mesh, unconstrained from limitations of the traditional L-system (developed in 1968 by Aristid Lindenmayer and discussed further below). A problem solved by the present method is that it is a difficult task to use custom-made geometry sections and to ensure that the mesh sections fit together without any holes or gaps, as intended. For example, it is relatively easy to ensure that procedurally created tubes fit together when creating a tree (see the discussion of L-systems developed by Aristid Lindenmayer below). However, if one needs to create for example a more complicated object, such as a tree, a cave system, or other complex objects, with more complex custom geometry with the added component of time, such as a branch growing off a main trunk of a tree, a cave system or lighting effects, etc. that develops over time, etc., it is not simple to procedurally create this complex shape and then use it to create a hierarchical or tree-like or branching structure without holes or seams. In one embodiment, the present method procedurally creates a styled tree-like or other hierarchical structure out of hand authored mesh assets or parts. The aim is to enable custom geometry to be utilized in the manner of more simple, procedurally generated structures so that they can be rendered realistically as they change in time, without obvious discontinuities.

The example method can be considered as split into three distinct operations which can be computed at runtime, though the method is not constrained to operating at runtime and may be operated "offline" in advance. These three distinct operations may be summarized or characterized as 1) generation of the structure, 2) creation of the entity conforming to the structure, and 3) updating the entity when required.

Generation of the unique structure in an example takes the form of two distinct steps: evaluating a set of rules to generate a set of commands and evaluating those commands to construct the assets or parts that make up the final object.

In the first step of evaluating the rules, any hierarchical object can be generalized into a style. For example, a silver birch tree can be defined as being tall and slim, with thin branches; a particular cave system can be defined as being a particular type of cave, such as for example a gold mine, a glacier cave, a solutional cave, etc. Other styles may be provided for other types of tree or other objects or structures that are not trees. This style can be represented by a linear (which may be multi-dimensional) structure of data symbols which represent for example parts of objects and utility commands. The rules are evaluated using a parallel rewriting system given a number of levels. This will produce a new data structure which defines a hierarchy of commands. This parallel rewriting system is an adaptation of Lindenmayer's L-system and uses similar principles, though adapted for use in this method.

In this regard, traditional L-systems, developed in 1968 by Aristid Lindenmayer, are parallel rewriting systems that were developed to model the growth process in plant development. They have been adapted in computer graphics to generate skeletons of trees, after which other procedural systems can automatically create tubes along the skeleton. Using these methods, one can procedurally create trees that have a seemingly random, yet natural appearance. However, this system is limited by the fact that one can only use descriptions of tubes. It is relatively easy to ensure that procedural tubes fit together when creating an object to be rendered graphically in a computer device. However, it is not a simple matter to extend the L-system for the production of other geometries, which limits the type of graphical shapes that can be rendered. It is particularly challenging when one considers the need to model the object at different times.

The next step of 2) evaluating those commands takes the hierarchy of commands and processes these to create the final asset(s) or part(s) of the object. There are two types of commands in this example: an asset type and a utility type. The asset type is a reference to a 4-dimensional mesh in this example. This reference is also accompanied with relevant materials for shading the object and transformation data (which in use are typically used by shaders, in particular vertex shaders, in a hardware processor, such as a graphics processing unit or GPU, or processing software or the like). In an example, the transformation data contains a 4D positional offset, a quaternion for aligning the next part of the object, and other data, for each branching point on the asset or part of the object.

In an example, the utility type is an instruction of one of the following: gravitational force, custom force, random rotation, clockwise yaw rotation, counter-clockwise yaw rotation, end branch and prevent branch aging. Other examples include phototropism where for example a plant grows towards a light source, wind direction where a part is forced to bend with the wind, etc. These instructions will either modify the part rotation about the previous branch direction, or apply constraints upon the 4th (time) dimension. During each command, if required, assets or parts of the object are created and transformed accordingly. After the system has processed all commands, a number of assets or parts of the object organized in a hierarchical structure in 4 dimensions are obtained.

The second operation 2) creation of the entity conforming to the structure includes generating the parts or assets that are to be joined together to form the display object. This includes visualizing a slice through time of the final object. For the third operation 3) updating the entity when required, in an example whilst creating the individual assets or parts of the object, materials have been created and assigned to handle the visualization through time. These materials sample a texture input which has been encoded with transformation data. This data is able to deform the mesh and therefore represent the object through its 4th (time) dimension. When using this system to create growing trees or other structures that change shape, this data would deform all vertices of a mesh from its final, cylindrical state, to a thin cylinder, then into a cone, and finally into a tiny seed where all vertices are collapsed on top of one another.

By setting an age on the material by means of a uniform parameter, vertex shaders of the graphics processor or processing software sample the relative deformation data from the texture and reposition the vertices accordingly. Each part's material would be assigned an offset in the fourth dimension (here, time). This will offset each part's individual age or local time and provides for a seamless join between parts so that the appearance of the final object formed of the parts is just one smooth mesh. Now by setting a constant age or time to the entire final object, with the addition of these local offsets in the 4th (time) dimension, the result is a singular, conformed, final object.

A description will now be given of a specific example of the present disclosure. The example will be given in terms of generating a display of a 3-dimensional object which changes shape, and in particular which changes shape over time in the context of a computer game. In this example, the generation of the display of the 3-dimensional object is carried out at runtime, that is when the computer game is running. However, the present disclosure may be used to generate in advance (i.e. not at runtime) display of a 3-dimensional object which changes shape over time. The present disclosure may also be used in other applications, such as for example computer drawings software packages.

The specific example described herein has two main stages. In the first stage, the content and related data is generated. In the second stage, the 3-dimensional object is generated for display on a display device, and the shape of the displayed 3-dimensional object is caused to change over time.

The specific example described herein will be given in terms of the 3-dimensional object being a tree. The tree can change shape, which may be used for example to represent the tree growing over time. However, the principles described herein may be applied to other 3-dimensional objects which change shape or appearance over time or which have different shapes or appearance ab initio. This includes for example other vegetation, such as shrubs and plants, leaves, flowers, fruit, etc. Other 3-dimensional objects which may be represented include treehouses or other buildings or structures, cave or tunnel systems, lightning bolts, robot-like or other animated characters, tentacles on creatures, rivers, power lines, etc. In other examples, the 3-dimensional object may be the interior of some space, such as the interior of a building or a cave network. In other examples, the 3-dimensional object may be a representation of a color or shading effect, which has the appearance of moving over or through a displayed scene or specific objects within a display scene in the manner of veins of spreading light or dark for example. In addition to or instead of a shape or appearance that changes over time, to represent for example a growing tree, a leaf that weathers over time, leaves passing from a mature green state to a withered and yellow or red Autumnal state, or for example an object that is damaged or eroded over time, etc., the techniques described herein can be used to cause 3-dimensional objects or parts of 3-dimensional objects to have an appearance that differs across the object and/or between parts ab initio in a computationally efficient manner.

In any event, because the 3-dimensional object changes over time or is different because of some other parameter, this may be regarded as a 4-dimensional model.

As a first operation in the content creation phase of the first stage, at least two parts of the object are created. These may be drawn by for example a human, using a computer, in a manner known per se. The two parts represent snapshots of a portion of the object at different times. In some examples, more than two parts of the object may be created. A greater number of parts created at this stage will result in a more fluid or seamless representation of the object changing shape overtime. On the other hand, a smaller number of parts created at this stage requires less time at this stage and also requires a lower data storage capability and a lower processing capability when the 3-dimensional object is being generated for display.

Figure 1:
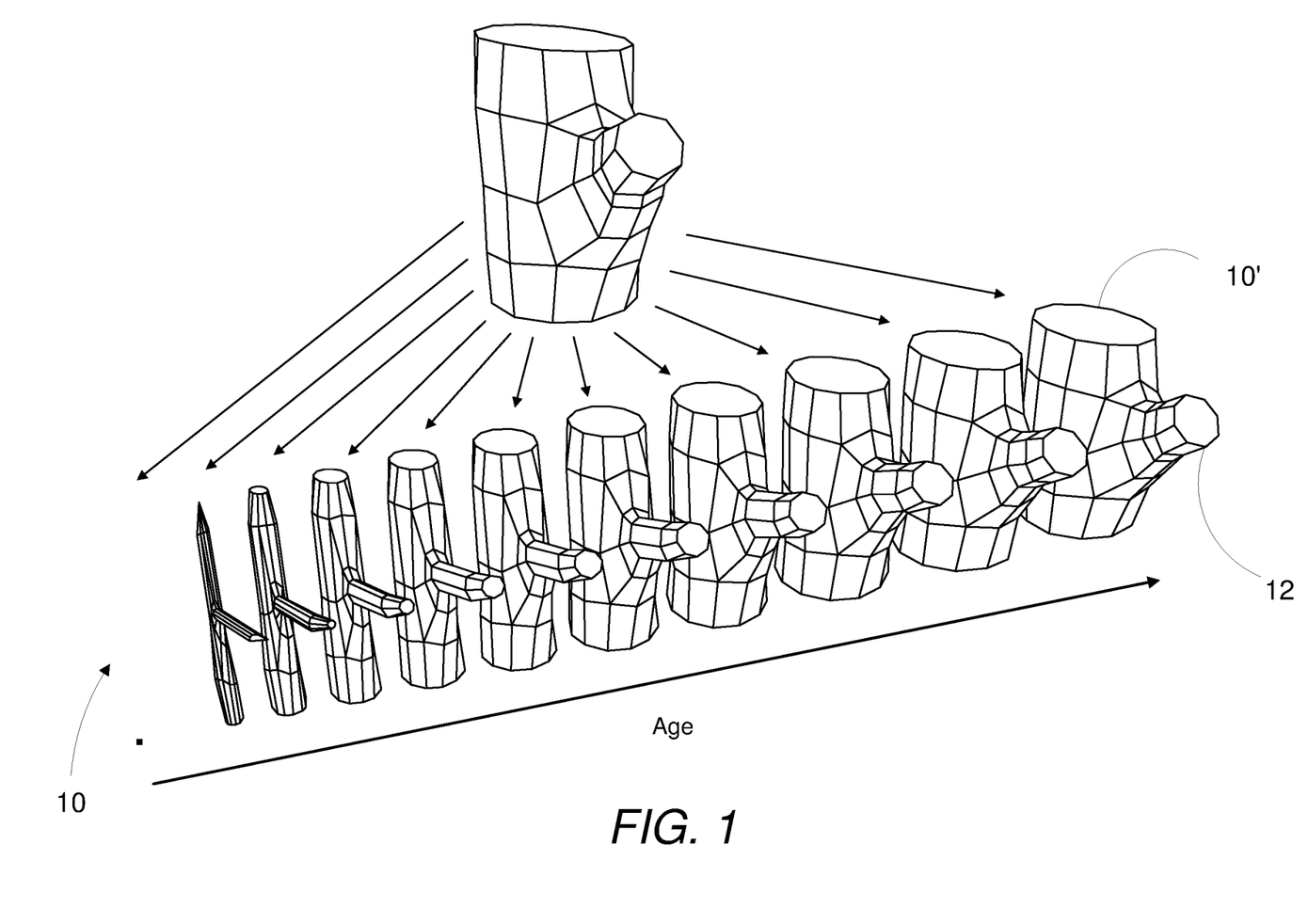
FIG. 1 shows schematically an example of a number of parts of a 3-dimensional object at different points in time.

An example of this is illustrated schematically in FIG. 1. This shows eleven parts 10 which, in this specific example, represent a section or portion of a tree at eleven different points in time. In other examples when modelling other objects or structures, such parts represent a portion of the other object or structure at different points in time. In yet other examples, the parts may represent parts of a 3-dimensional object that have an appearance that differs across the object. One of these parts 10 is subsequently used as a reference part when the 3-dimensional object is being generated for display. In this example, the reference part is a globally mature part, which is the part when it is at a maximum size. In the case of an object that is intended to grow over time when displayed, this corresponds to when the part is at its oldest state and is the part 10' at the rightmost part of FIG. 1 (also shown in the uppermost part of FIG. 1). In the case of an object that is intended to shrink or reduce in size over time when displayed, this corresponds to when the part is at its youngest state. A different, intermediate part 10 may be used as the reference part in other examples.

As is known in computer modelling per se, each part 10 is defined by a number of vertices 12. Going from one part 10 to another in increasing time in the example of FIG. 1, the vertices 12 move apart from each other, which represents the part growing over time. The movement of the vertices 12 relative to each other defines how the shape of the parts 10 develop over time and can be used to control the changing shape of the 3-dimensional object, as will be discussed further below. It may be noted that in the leftmost (youngest) part 10 in FIG. 1, all of the vertices 12 are collapsed to a single point, as indicated by the dot in the figure. In addition, it may be possible for an artist or other content creator to create two parts, such as the youngest part and the oldest part, "by hand" and then an automated computer process is used to generate any number of desired intermediate parts.

In principle, the different parts 10 could effectively be used in this format for generation of the 3-dimensional object for display. However, when drawing a number objects, such as trees or other objects or structures, this would place high demands on the graphics processor or the like that is generating the display, and may not be feasible for many graphics processors and/or may result in an appearance of growth that stutters and is not smooth.

Figure 2:
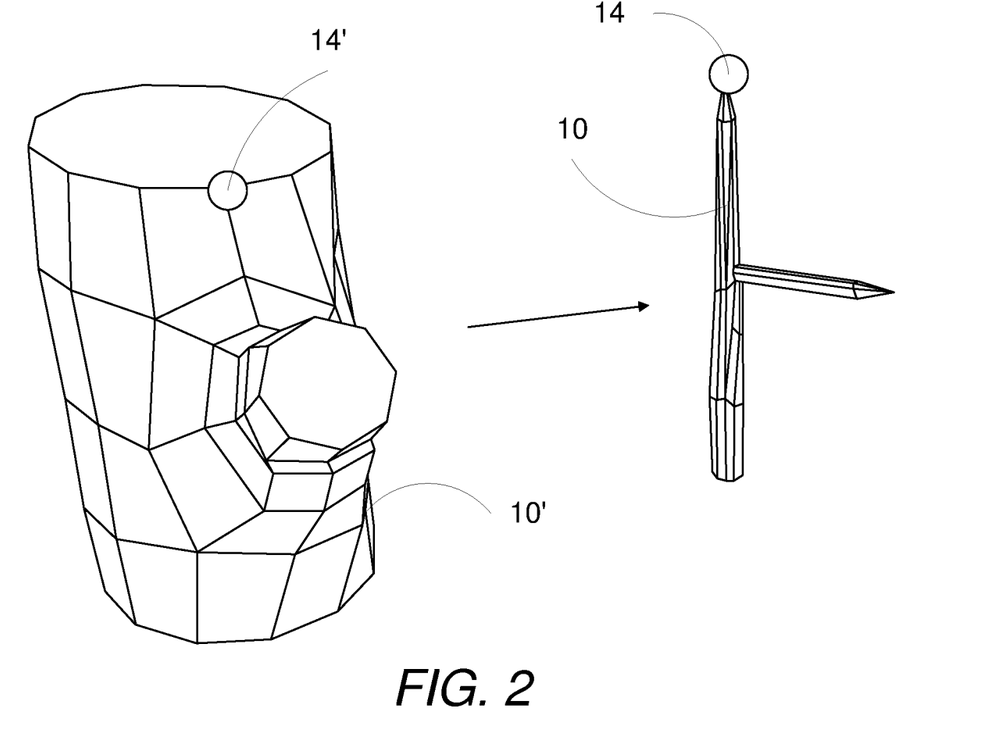
FIG. 2 shows schematically two of the parts of FIG. 1.

A more efficient way of handling this is to identify and record differences in the shape of each part 10 relative to the reference part 10', and send data relating to those differences to the graphics processor. In an example, for each of the created parts 10, the (apparent) movement of each vertex 12 of the part relative to the corresponding vertex 12 in the reference part 10' is identified. Referring by way of example to FIG. 2, this shows on the left the reference part 10' and on the right one of the other parts 10 (which in this example is the first part 10 following the leftmost (youngest) part 10 in FIG. 1 in which all of the vertices 12 are collapsed to a single point). In FIG. 2, a particular vertex 14' in the reference part 10' and the corresponding vertex 14 in the other part 10 are indicated.

Figure 3:
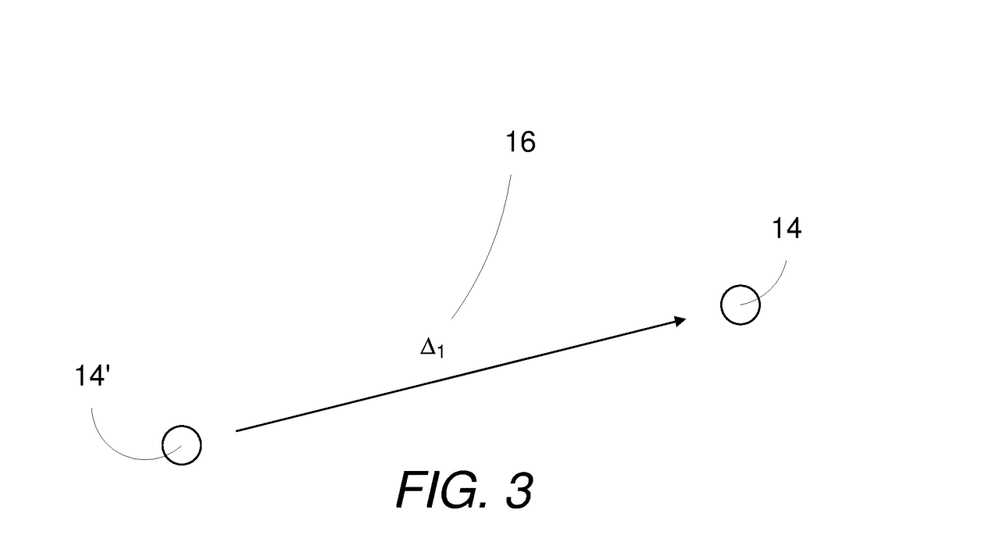
FIG. 3 shows schematically vertices of the parts of FIG. 2.

FIG. 3 shows for clarity the particular vertex 14' in the reference part 10' and the corresponding vertex 14 in the other part 10, with the other vertices 12 being omitted. FIG. 3 shows that the particular vertex 14' in the reference part 10' effectively moves along a vector or "delta" $\Delta_1$ to the corresponding vertex 14 in the other part 10. The delta $\Delta_1$ has x, y and z components. In the example shown, a left-handed coordinate system is used in which the z component points upwards, as indicated in FIG. 3. For reasons which will become clear, the x, y and z components of the delta $\Delta_1$ may be represented as RGB values of a color. That is, the delta $\Delta_1$ may be represented as a colored pixel $p_1$. It may be noted that pixel information is often conventionally stored with 8-bit precision and therefore 256 unique values per channel. 8-bit precision may be used in present examples. However, in this example, 32-bit precision is used so as to retain the range and precision of the data better.

Figures 4, 5:
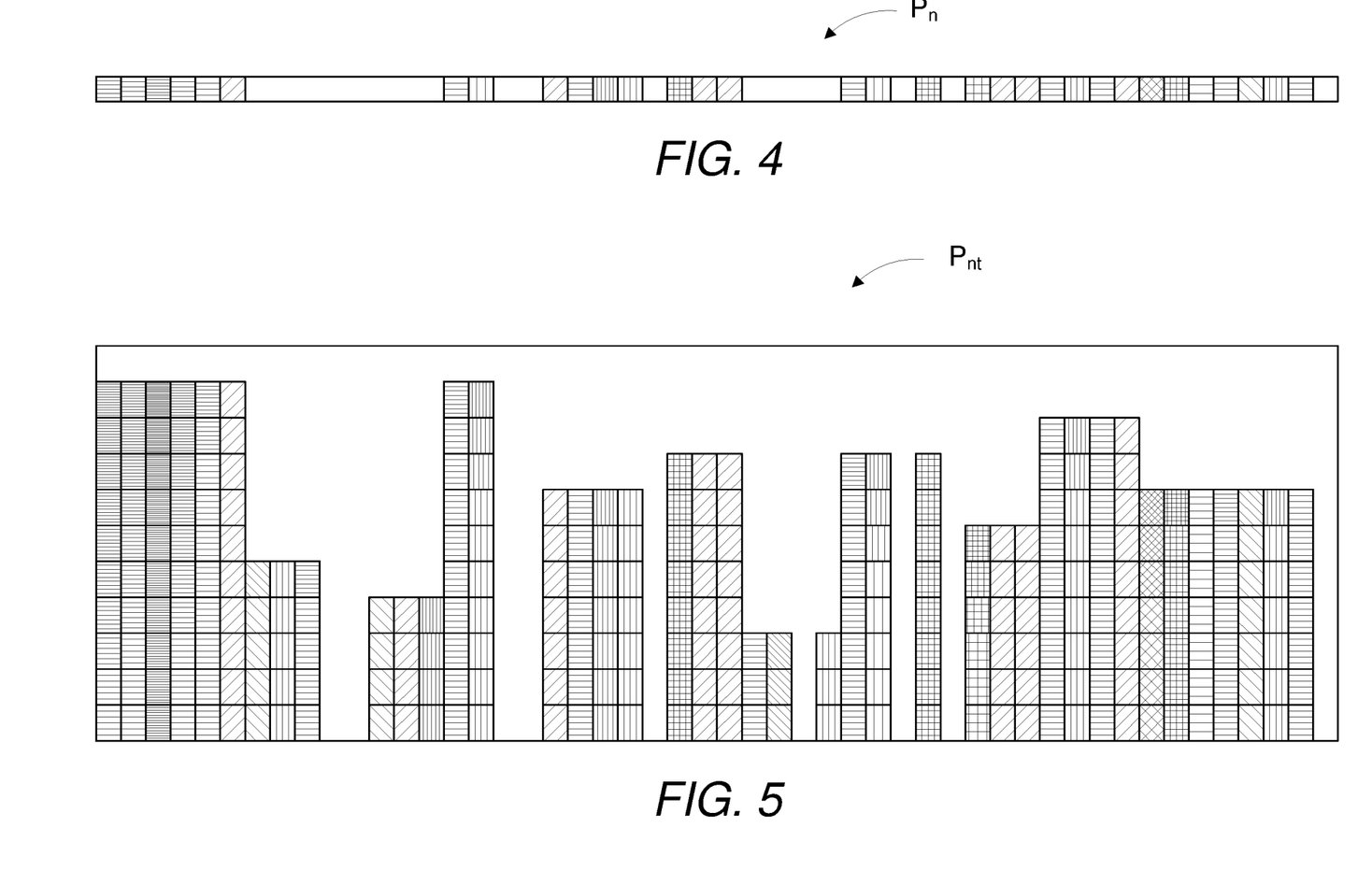
FIG. 4 shows schematically a representation of deltas for difference in the shape of a single part of FIG. 1.
FIG. 5 shows schematically a representation of deltas for differences in the shape of all the parts of FIG. 1.

This identifying of the relative movement of vertices 12 between the reference part 10' and the other part 10 is repeated for all of the vertices 12. This results in a corresponding number of deltas $\Delta_n$, one for each vertex 12. Correspondingly, this results in a corresponding number of colored pixels $p_n$. The colored pixels $p_n$ may then (conceptually at least) be arranged in a row. This is illustrated schematically in FIG. 4 for the case where each part 10 has fifty vertices and therefore there are fifty deltas $\Delta$ and therefore fifty colored pixels p. In FIGS. 4 and 5, whilst the individual "colors" of the pixels p will vary from case to case and typically will be unique, different values for each pixel, for the purposes of illustration the shading set out in Table 1 below is used to indicate schematically the colors in this specific example:

TABLE 1

| |
|---|
| ☰ Green |
| ▨ Red |
| ▧ Cyan |
| ⦀ Pink |
| ☰ Blue |
| ▨ Purple/Lilac |

This process is carried out for each of the other parts 10. This results in a number of sets of deltas, which may be represented as rows of colored pixels. This is illustrated schematically in FIG. 5 for the case where there is a total of eleven parts 10. FIG. 5 shows that the deltas for each vertex for each part 10 may be represented as a 2-dimensional matrix of pixels $p_{nt}$, where n is the number of vertices 12 (here fifty) and t is the number of time instants which corresponds to the total number of parts 10 (here eleven). It may be noted that the first, uppermost row is blank as that represents the reference part 10'.

The result of this is a reference part 10', which is defined by the x,y,z locations of its vertices 12, and a set of a number of differences or deltas $\Delta_n$, one for each other part 10 and in which each set of differences is used to define the relative movement of the vertices 12, which together represent (in this example) the section or portion of a tree at the different points in time. The set of deltas $\Delta_n$ is represented in this example as a texture. In other words, at the end of this initial creation phase, there is one 3-dimensional mesh, which defines the reference part 10', and a texture, which may be regarded as a data structure which is used to define relative movement of vertices 12 in the mesh or reference part 10'. Together, these are used subsequently to generate the 3-dimensional object for display and to cause the generated 3-dimensional object to change shape over time, as will be discussed further below.

As a next stage, at least one interface is defined for each of the parts 10. The interfaces 10 are used subsequently during the generation of the 3-dimensional object for display to enable different parts 10 to be joined in the displayed object. This joining of different parts 10 needs to be such as to present a smooth or seamless join that is not visible to a user. This use of different parts 10 that are joined in the displayed image provides for an efficient way of enabling a displayed 3-dimensional object to change shape over time. In this example, this enables a tree to appear to grow over time, by growing larger and optionally adding new branches, twigs, etc. In an example where the 3-dimensional object is say a cave or tunnel system, this can be used to show for example the cave or other structure growing over time. This growth may be "organic" in the sense that, analogously with a tree say, the cave or other structure expands to grow larger over time. This may be used for example to illustrate a cave or tunnel system becoming deeper as it is excavated or new tunnels are formed, etc.

To illustrate how this operates in practice during display of the 3-dimensional object, reference is made to FIGS. 6A to 6D. This example is a simple example for illustrative purposes in which each part is a thin branch or portion of a tree trunk.

Figure 6A:
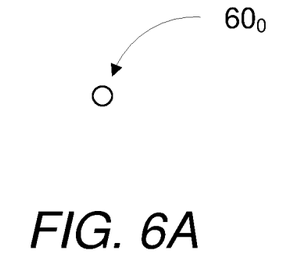
FIGS. 6A to 6D shows schematically an example of spawning and growth of parts of an object for display.

First, during display of the 3-dimensional object, a part is caused to be displayed or "spawned". This first part has its local time set to zero and therefore, as this represents the earliest time in the sequence, the first part is effectively a point $60_0$, as shown in FIG. 6A.

Figure 6B:
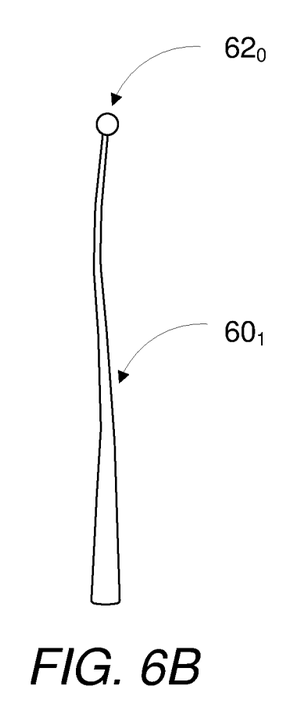

Next, the first part is effectively caused to grow larger. This is achieved by incrementing the local time for the part by one unit of time, that is by setting the local time for the part to 1 at this point. (Examples of how growth of an individual part may be achieved will be discussed further below.) As shown in FIG. 6B, this causes the first part to grow longer and thicker to become (in this example) an elongate stick-like part $60_1$. In addition, a second, new part is spawned. At this stage, the local time of the second part is set to zero and so the second part is effectively a point $62_0$, as shown in FIG. 6B.

Figure 6C:
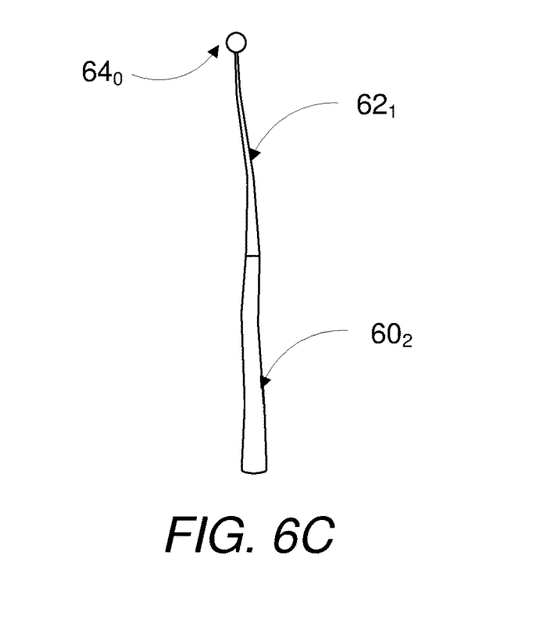
Figure 6D:
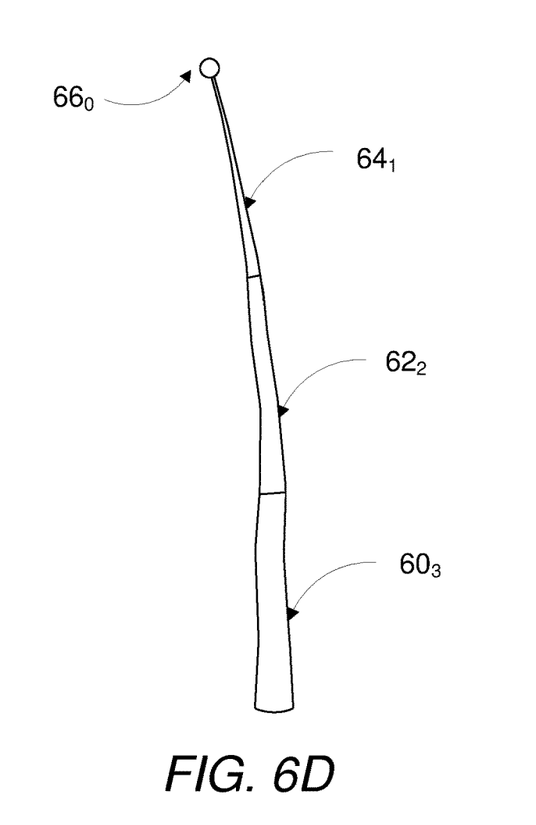

Next, the local time for each part is incremented by 1. As shown in FIG. 6C, the first part has grown longer and thicker, as indicated by $60_2$, and the second part has likewise grown longer and thicker, as indicated by $62_1$. In addition, a third, new part is spawned, with its local time set to zero, and so the third part is effectively a point $64_0$. This can be repeated as shown in FIG. 6D, which shows that the first to third parts have grown in size as indicated by references $60_3$, $62_2$, $64_1$ respectively, and a new part $66_0$ with local time set to zero has been added.

It may be noted that in this example, basically the same part 60 has effectively been used three times. The parts 60 are however different at least because they represent different slices of time, i.e. have been offset by different amounts in time such that they have different local time offsets. (In general, the parts 60 will also be different because of having been translated to be located at different positions and also rotated.) At this point in this example, it may be noted that the "time" for the whole object, which is formed of the individual parts 60, 62, 64, is 3 units of time, whereas the local time for the individual parts 60, 62, 64 is 3, 2 and 1 respectively.

This illustrates how each new part joins with a part that has previously been displayed on the display device. An important aspect that enables a smooth joining of the parts is the interfaces where the parts join to each other. For this, when a new part is displayed, the respective interfaces on the new part and the part to which it is joined are located in space and orientated relative to each other to provide a smooth, practically seamless join. For this, each interface is provided with transformational information or data which has two main components, namely a translational offset and an orientational offset. The translational offset moves the new part in local space in the displayed image relative to the previous part to which it is connecting. The orientational offset rotates the new part relative to the previous part. Taken together, this enables the new part to be in the correct position and orientation relative to the previous part regardless of the actual shapes of the respective parts as the interfaces of the respective parts are located and orientated correctly with respect to each other. Moreover, to obtain a "seamless" join and to facilitate a smooth transition between parts when growing or otherwise changing shape, the interfaces of the respective parts that are being connected in some examples are arranged to be the same size as each other. In other examples, however, the interfaces of the respective parts that are being connected may be of different sizes, depending on for example the effect or appearance that is desired. For example, it may be desired to add a part that intersects the previous part. As a specific example in the case of trees, this enables for example fruit or foliage to be added to a branch, etc. The size of the interface in its globally mature state may be defined as part of the interface. In an example, the transformational data also contains the normal, tangent, and binormal of the interface which may be used later in the runtime system to apply gravitational and/or other forces or effects.

Figure 7A:
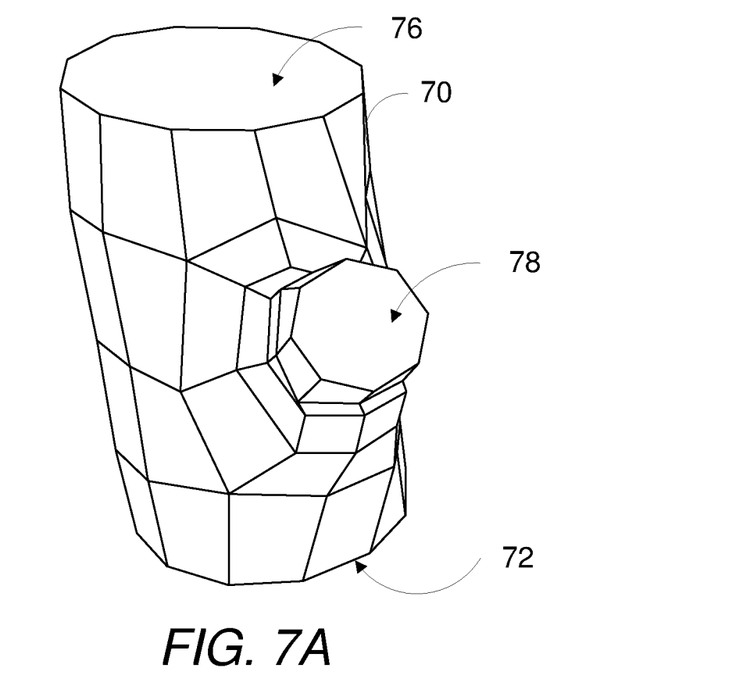
FIGS. 7A and 7B show schematically an example of a part and an interface of the part respectively.
Figure 7B:
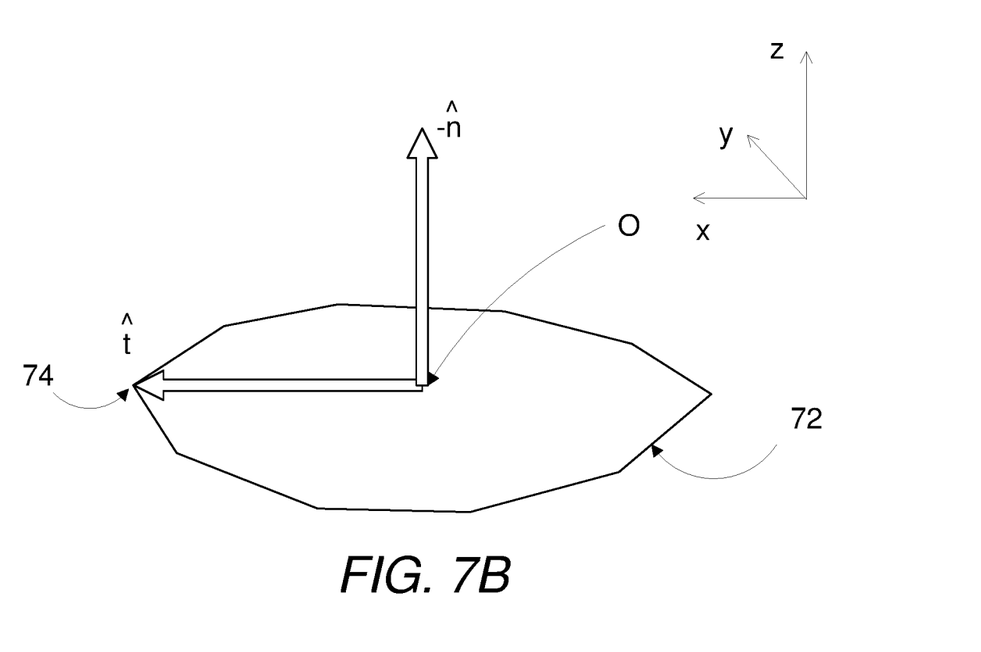

Discussing the interfaces further and referring now to FIG. 7A which shows an example of a part 70, each part has at least a base interface 72. The base interface 72 is shown more clearly in FIG. 7B. The base interface 72 is a polygon of n sides. The polygon in general may be an irregular polygon, though in some examples the polygon may be a regular polygon which can facilitate the orientation of parts in order to connect the parts. The center O of the polygon is the origin of the base interface 72. Moreover, the base interface 72 may be symmetric, having an order of symmetry which in general may be the same as or different from the number of sides n of the polygon. The inverted normal $-\hat{n}$ to the base interface 72 points upwards along the z axis. The tangent $\hat{t}$ of the base interface 72 (i.e. the vector that is a tangent to the surface of the base interface 72) originates from the origin O and points directly along the x axis. The tangent $\hat{t}$ passes through one of the vertices 74 on the border of the base interface 72 in this example.

In this example, the part 70 is not a terminating part and therefore has another, first or primary interface 76 in addition to the base interface 72. The primary interface 76 in this example is a polygon, which again in general is an irregular polygon but may be a regular polygon. The primary interface 76 contains a translational offset and an orientational offset. This orientation is calculated as follows. A normal $\hat{n}$ and a tangent $\hat{t}$ are derived for the primary interface 76. As for the base interface 72, the tangent $\hat{t}$ originates from the center of the primary interface 76 and points to one of the vertices of the primary interface 76. A quaternion rotation is then compiled from the two combined rotations of [0, 0, 1] to $\hat{n}$ and [1, 0, 0] to $\hat{t}$ respectively. (As is known per se, quaternions provide a mathematical notation for representing orientations and/or rotations of objects in three dimensions.) For this primary interface 76, the quaternion is now capable of orienting the normal to the base interface of the next part with its own normal, and also spinning the next part around its normal so that the tangents also align, all in one calculation. That is, this enables the mating interfaces of adjacent parts to be located and orientated correctly with respect to each other.

In this example, the part 70 has a further or secondary interface 78. This enables a further part to be joined to the first part. In this case as can be seen, the secondary interface 78 faces off from a main body or trunk of the part 70, which enables a further part to be added to represent for example a branch of a tree. The further part that is added may however represent other items, such as for example a component of a tree house or other object being modelled. Further interfaces may be provided on the part 70. Each interface is defined by a quaternion in the same manner as the primary interface 76.

The use of polygons for the interfaces 72, 76, 78 has the advantage that it effectively restricts the rotations that the next part can perform, which means that the rotation of the next part is more predictable and the next part can be aligned more easily with the previous part 70.

As a final phase in the first stage of generating the content and related data, rules are created or defined which are then used in the visualization stage to determine the appearance or "style" of the part of the object and therefore, typically, of the object as a whole. In the present example, the styles represent different species or types of tree. In other examples, the styles can represent different types of other objects or structures that are to be displayed, such as different types of lightning, lighting effects, cave networks, building structures, etc. The rules are typically generated "by hand" by the artist or other content creator. The use of the rules when the 3-dimensional object is generated for display on a display device will be discussed further below. Briefly though, when applied in present examples, the application of the rules results in a set or array of symbols which, in turn, are interpreted as commands which, in turn, are evaluated to generate instructions which are subsequently used to generate the object for display, as discussed further below.

The styles define a set of characteristics of the object to be displayed. Each style has an "axiom" and a set of rules. To assist in understanding styles and axioms and rules, and what is created at this stage, a brief overview of parallel rewriting systems will now be given. As mentioned, the parallel rewriting system used in examples herein and discussed in more detail below may be regarded as an adaptation of Lindenmayer's L-system and uses similar principles, adapted specifically for use in this method.

An L-system is an iterative, parallel rewriting system that uses a set of rules and an axiom. A discussion of an L-system will be given to illustrate this. The symbols and other representations discussed here are given to provide an illustrative example of the technique. In practice when run on a computer, the detailed implementation may differ somewhat, although the basic concepts are the same As a simple example, an axiom may be B and there may be rules such as:

$A \rightarrow B$         Rule 1

$B \rightarrow F,A$         Rule 2

During the operation of the parallel rewriting system, first a container is created for the symbols which will be created when the rules are applied. The axiom (B in this illustrative example) is inserted into the container. The parallel rewriting system is an iterative process so the subsequent steps are carried out repeatedly. At each iteration, the symbol(s) in the container are inspected and any symbols there are replaced according to the rules.

So, in this illustrative example of a parallel rewriting system, as the symbol initially in the container is B, this is replaced in accordance with the second rule with F, A. Now, the first rule specifies that A is replaced with B; in addition, there is no rule for F, so that is left unchanged. That means at the next iteration, F, A is replaced with f, B. Continuing likewise, at the next iteration, F is unchanged and B is replaced with F, A. The symbols in the container are therefore now F, F, A. This continues for a specified number of iterations and can be summarized by Table 2 below (for five iterations):

TABLE 2

| Iteration | Symbols |
| --- | --- |
| 0 | B (axiom) |
| 1 | F, A |

TABLE 2-continued

| Iteration | Symbols |
| --- | --- |
| 2 | F, B |
| 3 | F, F, A |
| 4 | F, F, B |
| 5 | F, F, F, A |

Whilst the adaptation of the known L-system for parallel rewriting as used in present examples will be discussed in more detail below, briefly, assume that, after a number of iterations, the resultant symbols are F, F, F, F, F, F, F, F, F, F, F, A. During the generation of the object for display, the symbol F is interpreted as a "part" or "asset" command whereas the symbol A is not recognized as a command and is simply ignored. This particular array of symbols will therefore cause an object to be constructed for display in which the object consists of eleven parts stacked on top of each other. (Compare with the example shown in FIG. 6D, which has four parts.) Further, the use of the interfaces on the parts, and the translation and orientation of the interfaces of the parts, as discussed above enable the connections or joins between the various parts to appear to be smooth and seamless.

As is known, the L-system is able to deal with branching structures, so as to be able to generate images of trees or plants with branches or shoots, etc. Correspondingly, the above example is a simple example using a one dimensional set or array of symbols, but this may in practice be easily extended to be a two dimensional array of symbols to accommodate for example branching or other, more complex or sophisticated structures, whether for trees or for other objects or structures being modelled.

As mentioned, the rules are created or defined, typically "manually" by an artist or content creator, so that the final object has the desired style, i.e. a desired appearance which can be different for different objects that nevertheless have the same style. In the example of trees, this means that for example a number of trees of the same type (e.g. oak or willow, etc.) can be generated which each have a different appearance. As another example in the case of caves say, different appearances may be used to represent different types of caves, such as for example a gold mine, a glacier cave, a solutional cave, etc.

The application of the rules results in a set or array of symbols which, in turn, are interpreted as commands which, in turn, are evaluated to generate instructions for subsequent use when the object is being generated for display. There are two main types of commands: a part or asset command and a utility command.

A part command was symbolized by F in the illustrative example above. This is used to construct a part at its current position in the hierarchy of parts, as mentioned above and as will be discussed further below.

A utility command acts as a modifier of the structure, i.e. to modify some portion of the object that is being generated for display. When the object is being generated for display, a utility command is interpreted as an instruction to apply some predefined function at the current point in the hierarchy. Again, this will be discussed further below.

Some examples of utility commands are summarized in Table 3 below, it being understood that this may be extended to other applications:

TABLE 3

| Symbol | Description | Weighted |
|---|---|---|
| \| | Gravitational Force | ✓ |
| # | Custom Force | ✓ |
| ~ | Random Rotation | ✓ |
| / | Yaw Clockwise | ✓ |
| \\ | Yaw Counterclockwise | ✓ |
| ! | End Branch Immediately | X |
| ? | Prevent Branch Aging | X |

It may be noted some of the utility commands permit a "weighting" to be specified and applied. In each of these examples here, the utility commands that permit a weighting are commands that cause a part of the object to rotate relative to a previous part. As a specific example, a gravitational force may be applied so as to cause a tree branch to droop downwards as the branch extends away from the trunk of the tree and the amount or degree of drooping may be determined by the weighting that is applied. The weightings may be specified in the rules in for example parentheses, for example #(0.5) for a 50% weighting of the Custom Force. If no weighting is specified, a default value of 1 may be assumed.

With the various different types of symbols that can be generated by the rules, and which are interpreted as commands when the object is being generated for display, complex styles can be created to result in correspondingly complex objects. This facilitates the subsequent procedural generation of objects that can nevertheless have very different appearances from each other. To illustrate the possible complexity of styles that can be created, and without going into the details of the meaning of the rules and axiom of this example, a style may have a set of rules like:

$R=|(5),E,|(5),E,K,|(5),E,|(-5),E,|(-5),E,|(-5),E$ $C=~,|,R,C$ $B=~,|(-0.25),#,P,L,O,Y$ $M=~,|(-0.75),#,B$ $H=M,H$ and an axiom like:

$~,S,R,B,H,T$

Following this first preliminary or set-up stage, the 3-dimensional object is generated for display on a display device and the shape of the displayed 3-dimensional object is caused to change over time in the second stage. This second stage is carried out by a computing device operating in accordance with instructions in a computer program. As mentioned, this may be carried out at runtime when for example a computer game is running on a computing device. In other examples, this may be carried out as a separate process, such as for generating an artistic work using a software drawings package, for generating moving images for a film or movie, for post-processing of images, etc., in each case on a computing device. Such computing devices have one or more processors, RAM or other working memory and optionally persistent storage. The generation of the 3-dimensional object may be carried out by for example a graphics processor, which may be provided by for example a graphics card or by integrated graphics provided as part of a central processing unit. The computing device may have an integral display device, or may send the image data for display to a separate display device, or may send the image data to storage for sending later to a display device.

As mentioned, in an example the second stage can be considered as comprising three distinct operations which can be computed at, but are not constrained to be computed at, runtime. In this context, runtime means the time at which the object is to be rendered so as to be made visible on a display screen.

The three operations may be summarized as:
1) generation of the unique structure,
2) creation of the entity conforming to the structure, and
3) updating the entity when required With regard first to 1) generation of the unique structure, in an example this takes the form of two distinct steps: (i) evaluation of the rules and (ii) evaluation of the commands. The purpose of (i) evaluating the rules is to use the parallel rewriting system technique to generate a 2-dimensional hierarchical array of commands. The purpose of (ii) evaluating the commands is to generate an optimal buffer of instructions. These instructions contain the minimum necessary information which is used in the next step such that no further calculations are required to determine where to place the objects, what object to place, the rotations, etc. For example, an instruction would inform the system to place a specific piece of geometry (e.g. a part of an object to be displayed) at a particular location and in a particular orientation in the "world space". (The "world space" is the frame of reference in which everything within the world that is being modelled on the display device is located in absolute coordinates.) After all these instructions have been processed, this results in an object that conforms to the previously defined structure.

Discussing now 1) (i) evaluation of the rules in more detail, when the rules of the style are applied, the system first inspects each of the symbols that are generated to check whether they are a part command. If a symbol is a part command, then the system checks if that part contains any secondary interfaces. If it does, then, in line with the discussion of interfaces above, the system treats these secondary interfaces as branches. A new symbol array is created, and instantiated with the "additional command" symbol predefined in the secondary interface. The original symbol array then makes a note of this branch by adding a "branching symbol". This branching symbol is a pointer to the newly created symbol array. This can be seen by the following example. Note that there are plural symbol arrays in this example, which are indexed 0, 1, . . . .

Assume that the first symbol array, which has index 0, contains the symbols F, A. (Again, it is emphasized that this is a simplified example for the purposes of illustrating the example, and that the arrays of symbols in practice will normally be more complex.) This can be represented by the following Table 4:

TABLE 4

| Symbol Array Index | Array Content |
|---|---|
| 0 | F, A |

As mentioned above, in this illustrative example, the symbol F is interpreted as a "part" command (and the symbol A is not recognized as a command and is simply ignored). Accordingly, it is checked whether the part contains any secondary interfaces. If yes, then a new symbol array is created, labelled with the next index, here index 1.

Now, for any secondary interface, an additional command is defined. The purpose of this is to serve as a new axiom for the new branch in the parallel rewriting system. Without this, the branch would abruptly end without any geometry. Assume that the additional command for this secondary interface is represented by the symbol B. This is then set at the axiom for the newly created array (which here has index 1). Furthermore, a branching symbol is inserted into the original array (which here has index 0). Let the branching symbol be {1}.

The result of this rule evaluation in this example can be represented by the following Table 5:

TABLE 5

| Symbol Array Index | Array Content |
|---|---|
| 0 | F{1}, A |
| 1 | B |

As an option in the rule evaluation process, an element of chance can be introduced. That is, the chance or probability that a symbol gets replaced in accordance with a rule can be specified as part of the rule. Otherwise, if no chance is specified, then the symbol always gets replaced in accordance with the rule. An advantage of this is that it enables the object that is generated for display to have an appearance that is random, at least to a degree specified by the rules, even though the object is procedurally generated. This further assists in generating plural objects for display that are not all identical in appearance.

This is illustrated by the following example. Here, the rules are:

A->B    Rule 1

B(0.8)->F,A    Rule 2 where the chance of Rule 2 being followed is 80%.

In this example, this means that there is an 80% chance that the symbol B will be replaced by F, A and a 20% chance that the symbol B will be unchanged.

After 1) (i) evaluation of the rules is complete, there is now a set of array symbols. These symbols are then processed to enable 1) (ii) evaluation of the commands, thereby to generate the instructions required subsequently to generate the object for display. This is explained most simply by example. It will be understood that again this is merely an illustrative example and that actual implementations will in practice differ greatly, both in terms of the details and the complexity that is possible with the methods disclosed herein.

In this example, the symbols are first processed to remove all symbols that are not commands. In this regard, it will be recalled that some symbols are only used during the process of evaluating the rules. Accordingly, the symbols are inspected and any symbols that are not commands are removed.

For example, assume that the following symbol arrays were generated as a result of the evaluation of the rules:

TABLE 6

| Symbol Array Index | Array Content |
|---|---|
| 0 | F{1}, ~, S, F{2}, A |
| 1 | D, B |
| 2 | D, B |

The symbols A and B here are recognized as not being commands and are therefore removed, resulting in the following in this example:

TABLE 7

| Symbol Array Index | Array Content |
|---|---|
| 0 | F{1}, ~, S, F{2} |
| 1 | D |
| 2 | D |

The commands can now be evaluated. This is carried out by considering first the first symbol array, which has index 0. The symbols in the content of the first symbol array are processed in sequence. In this example, the first command F is recognized as being a part command. Accordingly, an instruction is generated which will be used subsequently to construct the part, i.e. to instantiate the geometry of F. In general for a part command, the part F is instantiated at its current position in the hierarchy of parts. In this case as this is the first part that is being constructed or instantiated, the part will be instantiated at the root or base of the overall object that is being generated in this example. Moreover, as no other parts have previously been created, and assuming that the overall object has no initial rotation, the part will be instantiated with its geometry facing upwards in the z direction and with no rotation. It will be appreciated though that this can easily be modified if for example some rotation is required.

Referring back to Table 7, it can be seen that in this example the first symbol (now treated as a command) is followed by {1}, which, in this example, is a branching command. The system therefore knows that the part F contains one secondary interface. Accordingly, in this example the symbol array having the index that is referenced in the branching command is processed next. In this example, this is the symbol array having the index 1 as this branching command { } contains the pointer 1.

The symbol array 1 in this example has a first symbol D (which, in this simple illustrative example, is the only symbol in this array). This is recognized as a part command in this example. Accordingly, an instruction is generated which will be used to construct the part D, i.e. to instantiate the geometry of D. Moreover, as this is a branch, the part D will be positioned and rotated as necessary so that its base interface aligns with the first, and only, secondary interface of (the first instance of) the part F.

As there are no more commands in symbol array 1 in this example, the process returns to the previous symbol array, here symbol array 0, and specifically to the point in symbol array 0 where it previously branched (at {1}). In this example, the next command in symbol array 0 is ~. In this example this is a utility command which, in a particular example, is used to generate an instruction that will apply a random rotation. The random rotation is calculated so as to conform to the order of symmetry of the primary interface of the part F. The random rotation is at this point stored for later use.

The process then moves to the next command in symbol array 0. In this example this is S, which is another part command in this example. Accordingly, instructions are generated which are such that the part S will be generated along with the necessary accumulated translations and rotations (including in this example the random rotation previously calculated) so that the base interface of the part S aligns with the primary interface of the part F and, moreover, so that it also conforms to the style provided for the overall generated object.

This process continues similarly through the remaining symbols in the symbol arrays until all of the symbols in all of the symbol arrays have been processed. In this example, this includes F{2}, which is another instance of the part F.

The result of this at this stage is a set of instructions which can then be used to generate the object for display. It may be noted that these instructions are not dependent on each other and can in general be executed in any order. This is due to the fact that all transformation data is represented in its simplest form and requires no more computation. This data also relates to the world space in which the object is placed. As noted, in an example, the transformation data contains a 4D positional offset, a quaternion for aligning the next part of the object, and other data, for each branching point on the asset or part of the object. All the transformations and time offsets that each part inherits are compiled together to create the part's final transformation and time offset in the world space.

Accordingly, the object can now be generated for display using the instructions that have been created. In an example, this proceeds by carrying out each instruction in sequence, creating an instance of the geometry or mesh of each part at that particular world space transformation and time offset and assigning an instance of the material to the part. It is mentioned again that this "sequence" is in general unordered, that is the instructions can in general be carried out in any order.

In an example, first the parts are instanced using the instructions. By way of example, the instructions contain the following information: mesh, material(s), translation, rotation and time offset.

In this regard and simply put, the material determines the look of the part.

Depending on or example the specific shaders used in the graphics processor or processing software or the like, the material defines how shiny or reflective or matte the part is, the color and transparency of the part, tiling information, etc. As mentioned, the instructions can in general be carried out in any order.

Instancing per se is a well-known technique used in graphics processing. Accordingly, only the main differences of the present example over standard instancing techniques will be discussed here.

In the present example, when a material is instanced on or for a part, a reference to that material is stored. The data for the material is relatively large and, moreover, processing the material to create the data is relatively processor-intensive. When a new instance of the same material needs to be instanced, the reference to that material is noted and the same material can be instanced from that stored reference. This avoids having to create and store a potentially very large number of materials that are in fact the same: only one instance per material needs to be stored. This is particularly useful given that a scene may contain a large number of such objects (which may be trees or other objects as discussed above) and each object may be formed of a large number of parts.

The time offset of each part is read from the instruction by the shaders of the graphics processor or processing software or the like. The visualization or appearance of the parts can then be adjusted as necessary.

In particular, in this example the precomputed data for each part is decoded by the shaders. The precomputed data for each part is contained in the delta-encoded texture data structure discussed above and shown schematically by way of example in FIG. 5. The deltas in this texture data structure are decoded and applied as object space offsets for the particular part. An important consideration here is the "time" that should be set for the part, so that it is visualized with the correct time and shape, both relative to other parts that make up the overall object and relative to other objects and, in the case of a computer game or the like, the total running time of the game.

In regard to the time, first, in the case of a computer game or the like, there may be a "global time", which represents the time elapsed since the computer game was started (for example, by a player or other user). If this global time is used for all objects, then all of the objects would appear to be created at the same time, and will "grow" or otherwise change shape at the same time. This may be suitable in some cases and/or for some objects. However, in other cases, it may be desired for (at least some of) the objects to appear to be created at different times and to "grow" or otherwise change shape at different times. Accordingly, the parts that make up a particular object may be assigned a global time offset, which causes the parts and therefore the object to start growing or otherwise change shape after elapse of that global time offset from the start of the computer game. As a simple example to illustrate this, if an object is to start growing at 120 seconds after the game begins, all mesh instances for that particular object are instructed to possess a global time offset value of 120. That is, in this example, the local time for that particular object as a whole may be calculated by the shaders as:

Local Time (object)=(Global Time−Global Time Offset)     Equation 1

In addition, as discussed above, in an example each individual part of the object has its own local time offset. This is because the parts effectively represent different slices of time, i.e. have been offset by different amounts in time. Accordingly, the local time for a particular part of an object may be calculated by the shaders as:

Local Time(part)=(Global Time−Global Time Offset)−Local Time Offset     Equation 2

Following the above, the objects will be created/visualized to appear at different times according to the global time offset for the different objects, and further will also grow or otherwise change shape according to the individual local time offsets of the individual parts of the objects. In this regard, with this example, the objects will grow or otherwise change shape at the same rate. This may be desirable in some cases. However, if it is desired that the objects grow or otherwise change shape at different rates, a further scalar variable "grow speed" may be added. In such a case, the local time for a particular part of an object may be calculated by the shaders as:

Local Time(part)=((Global Time−Global Time Offset)−Local Time Offset)*Grow Speed     Equation 3

Using this method, all of the necessary information needs to be passed to the instance buffer once and once only for the entire life cycle of the object as the object grows or otherwise changes shape. Other than the passing of the global time from the CPU or other main processor of the computing device as usual, there does not need to be any further communication to the graphics processor or processing software or the like from the CPU or other main processor of the computing device simply to make the object appear to grow or change shape over time. In prior techniques if an object is to change shape or otherwise be updated, typically the CPU or other main processor of the computing device has to communicate with the graphics processor or processing software to send instructions which then have to be processed by the graphics processor. This communication between the CPU and the GPU is usually a slow part of the update process and, other than the usual passing of the global time from the CPU to the GPU, which is a small amount of data, is avoided in examples described herein. As a result, examples described herein enable a smooth, uninterrupted changing of shape of the objects and there does not need to be any selective updating of the objects.

Reference is made herein to data storage for storing data. This may be provided by a single device or by a plurality of devices. Suitable devices include for example a hard disk and non-volatile semiconductor memory (e.g. a solid-state drive or SSD), etc.

Although at least some aspects of the embodiments described herein with reference to the drawings comprise computer processes performed in processing systems or processors, the invention also extends to computer programs, particularly computer programs on or in a carrier, adapted for putting the invention into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc.

It will be understood that the processor or processing system or circuitry referred to herein may in practice be provided by a single chip or integrated circuit or plural chips or integrated circuits, optionally provided as a chipset, an application-specific integrated circuit (ASIC), field-programmable gate array (FPGA), digital signal processor (DSP), graphics processing units (GPUs), etc., depending on the particular application. The chip or chips may comprise circuitry (as well as possibly firmware) for embodying at least one or more of a data processor or processors, a digital signal processor or processors, baseband circuitry and radio frequency circuitry, which are configurable so as to operate in accordance with the exemplary embodiments. In this regard, the exemplary embodiments may be implemented at least in part by computer software stored in (non-transitory) memory and executable by the processor, or by hardware, or by a combination of tangibly stored software and hardware (and tangibly stored firmware).

The examples described herein are to be understood as illustrative examples of embodiments of the invention. The invention may be applied to model for example trees, buildings or other structures, cave or tunnel systems, lightning bolts, robot-like or other animated characters, tentacles on creatures, rivers, power lines, etc. In other examples, the object that is modelled may be the interior of some space, such as the interior of a building or a cave network. In other examples, the object that is modelled may be a representation of a color or shading effect, which has the appearance of moving over or through a displayed scene or specific objects within a display scene in the manner of veins of spreading light or dark for example. Further embodiments and examples are envisaged. Any feature described in relation to any one example or embodiment may be used alone or in combination with other features. In addition, any feature described in relation to any one example or embodiment may also be used in combination with one or more features of any other of the examples or embodiments, or any combination of any other of the examples or embodiments. Furthermore, equivalents and modifications not described herein may also be employed within the scope of the invention, which is defined in the claims.

What is claimed is:

1. A computer-implemented method of changing a display of a 3-dimensional object_from a first instance of the 3-dimensional object having a first part and a second part to a second instance of the 3-dimensional object having a first reference part and a second reference part, the method comprising:
   generating for display the first part of the first instance of the 3-dimensional object, the first part having at least a base interface and a first interface;
   causing the first part of the first instance of the 3-dimensional object to be displayed on a display device, the first part having a shape of the first reference part at a first local time point thereof;
   receiving the second instance of the 3-dimensional object having the first reference part and the second reference part;
   after receiving the second instance of the 3-dimensional object, causing the displayed first part of the first instance of the 3-dimensional object to change shape to a shape of the first reference part at a second local time point thereof;
   generating for display the second part of the 3-dimensional object, the second part having at least a base interface;
   translating and orientating the second part so that the base interface of the second part mates with the first interface of the first part when the second part is displayed on the display device;
   causing the second part of the first instance of the 3-dimensional object to be displayed on the display device with the base interface of the second part mating with the first interface of the first part, the second part having a shape of the second reference part at a first local time point thereof;
   storing the first reference part as a 3-dimensional mesh; and
   storing difference data defining differences between the first instance of the 3-dimensional object and the second instance of the 3-dimensional object at a number of different local time points as a texture, wherein the difference data includes translational data for one or more vertexes of the first and second reference parts representing the difference in position for the respective vertex at the different local time points.

2. A method according to claim 1, wherein the causing the displayed first part to change shape causes the displayed first part to change shape over time such that the displayed 3-dimensional object changes shape over time.

3. A method according to claim 1, comprising:
   causing the displayed first part to further change shape to a shape of the first reference part at a third local time point thereof, and
   causing the displayed second part to change shape to a shape of the second reference part at a second local time point thereof,
   wherein the changing shapes of the first and second parts are such that the base interface of the second part continues to mate with the first interface of the first part.

4. A method according to claim 3, comprising:
generating for display a third part of the 3-dimensional object, the third part having at least a base interface; and
displaying the third part on the display device, the displayed third part being translated and oriented as necessary so that the base interface of the third part mates with a second interface of the first part or a first interface of the second part, the third part having a shape of a third reference part at a first local time point thereof.

5. A method according to claim 1, wherein each part of the 3-dimensional object is instanced by a graphics processor based on the same data structure.

6. A method according to claim 5, wherein the first and second reference parts are a same reference part, and wherein the data structure contains data that defines an original shape for said same reference part.

7. A method according to claim 6, wherein the original shape for said same reference part is defined by a plurality of vertices.

8. A computer system comprising:
at least one processor;
and at least one memory including computer program instructions;
the at least one memory and the computer program instructions being configured to, with the at least one processor, cause the computer system to carry out a method of changing a display of a 3 -dimensional object from a first instance of the 3-dimensional object having a first part and a second part to a second instance of the 3-dimensional object having a first reference part and a second reference part, the method comprising:
generating for display the first part of the first instance of the 3-dimensional object, the first part having at least a base interface and a first interface;
causing the first part of the first instance of the 3-dimensional object to be displayed on a display device, the first part having a shape of the first reference part at a first local time point thereof;
receiving the second instance of the 3-dimensional object having the first reference part and the second reference part;
after receiving the second instance of the 3-dimensional object, causing the displayed first part of the first instance of the 3-dimensional object to change shape to a shape of the first reference part at a second local time point thereof;
generating for display the second part of the 3-dimensional object, the second part having at least abase interface;
translating and orientating the second part so that the base interface of the second part mates with the first interface of the first part when the second part is displayed on the display device;
causing the second part of the first instance of the 3-dimensional object to be displayed on the display device with the base interface of the second part mating with the first interface of the first part, the second part having a shape of the second reference part at a first local time point thereof;
storing the first reference part as a 3-dimensional mesh; and
storing difference data defining differences between the first instance of the 3-dimensional object and the second instance of the 3-dimensional object at a number of different local time points as a texture, wherein the difference data includes translational data for one or more vertexes of the first and second reference parts representing the difference in position for the respective vertex at the different local time points.

9. A non-transitory computer-readable storage medium comprising a set of computer-readable instructions stored thereon, which, when executed by a computer system, cause the computer system to carry out a method of changing a display of a 3-dimensional object from a first instance of the 3-dimensional object having a first part and a second part to a second instance of the 3-dimensional object having a first reference part and a second reference part, the method comprising:
generating for display the first part of the first instance of the 3-dimensional object, the first part having at least a base interface and a first interface;
causing the first part of the first instance of the 3-dimensional object to be displayed on a display device, the first part having a shape of the first reference part at a first local time point thereof,
receiving the second instance of the 3-dimensional object having the first reference part and the second reference part;
after receiving the second instance of the 3-dimensional object, causing the displayed first part of the first instance of the 3-dimensional object to change shape to a shape of the first reference part at a second local time point thereof;
generating for display the second part of the 3-dimensional object, the second part having at least a base interface;
translating and orientating the second part so that the base interface of the second part mates with the first interface of the first part when the second part is displayed on the display device;
causing the second part of the first instance of the 3-dimensional object to be displayed on the display device with the base interface of the second part mating with the first interface of the first part, the second part having a shape of the second reference part at a first local time point thereof;
storing the first reference part as a 3-dimensional mesh; and
storing difference data defining differences between the first instance of the 3-dimensional object and the second instance of the 3-dimensional object at a number of different local time points as a texture, wherein the difference data includes translational data for one or more vertexes of the first and second reference parts representing the difference in position for the respective vertex at the different local time points.

* * * * *